US012810290B2

(12) United States Patent
Samson

(10) Patent No.: US 12,810,290 B2
(45) Date of Patent: Nov. 24, 2026

(54) CONFIGURABLE PAYMENT INSTRUMENT

(71) Applicant: American Express Travel Related Services Company, Inc., New York, NY (US)

(72) Inventor: Edward K. Samson, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 400 days.

(21) Appl. No.: 18/065,821

(22) Filed: Dec. 14, 2022

(65) Prior Publication Data

US 2024/0202716 A1 Jun. 20, 2024

(51) Int. Cl.
*G06Q 20/38* (2012.01)
*G06Q 20/34* (2012.01)
*G06Q 20/40* (2012.01)

(52) U.S. Cl.
CPC ....... *G06Q 20/3829* (2013.01); *G06Q 20/341* (2013.01); *G06Q 20/409* (2013.01)

(58) Field of Classification Search
CPC ............. G06Q 20/3829; G06Q 20/341; G06Q 20/409; G06Q 20/227; G06Q 20/3221; G06Q 20/352; G06Q 20/355; G06Q 20/3576; G06Q 20/20; G06Q 20/204; G06Q 20/3572; G06Q 20/401
See application file for complete search history.

(56) References Cited

U.S. PATENT DOCUMENTS

| | | | | |
|---|---|---|---|---|
| 8,515,868 | B2 * | 8/2013 | Hirka | G06Q 20/342 705/41 |
| 11,301,837 | B2 * | 4/2022 | Kamaal | G06Q 20/3572 |
| D956,760 | S | 7/2022 | Vu | |
| 11,562,194 | B2 * | 1/2023 | Vu | G07F 7/1008 |
| 2016/0267466 | A1 * | 9/2016 | Kumnick | G07F 7/0806 |
| 2018/0005227 | A1 * | 1/2018 | Sandeløv | G06Q 20/20 |
| 2020/0005579 | A1 * | 1/2020 | Vu | G06Q 20/3572 |
| 2023/0137471 | A1 * | 5/2023 | Moncada | G06K 19/07739 235/492 |

FOREIGN PATENT DOCUMENTS

| | | | | |
|---|---|---|---|---|
| GB | 2492952 | A * | 1/2013 | G06K 19/06196 |
| WO | WO-2012140625 | A1 * | 10/2012 | G06Q 20/204 |

* cited by examiner

*Primary Examiner* — Sonji N Johnson
(74) *Attorney, Agent, or Firm* — Thomas Horstemeyer, LLP

(57) ABSTRACT

Payment instruments and methods of configuring payment instruments are described. In one non-limiting example, a payment instrument that includes a front face, a rear face, and a card identifier associated with the payment instrument. Additionally, the payment instrument includes a first embedded device and a second embedded processor device. The first embedded device stores a first cryptogram key that is used to charge a first transaction to a first financial account. The second embedded device stores a second cryptogram key that is used to charge a second transaction to a second financial account.

14 Claims, 10 Drawing Sheets

CONFIGURABLE PAYMENT INSTRUMENT

BACKGROUND

Financial institutions provide payment instruments, such as debit cards, credit cards, gift cards, payment cards, etc., to their customers in order to enable customers to make purchases of goods and services. By having access to their financial accounts via payment instruments, customers have a convenient mechanism for making purchases without having to carry cash or checks. Typically, the user has a separate payment instrument for each financial account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The various embodiments of the present disclosure relate to a payment instrument that can be configured to access two or more financial accounts at point-of-sale (POS) terminals. Additionally, the various embodiments include approaches for configuring a payment instrument to access a first set of financial accounts for a first period of time and reconfiguring the payment instrument to access a second set of financial accounts for a second period of time.

A typical payment card, such as a credit card, a debit card, or a gift card, uses a small portion of the available area on the payment card. Additionally, most people carry multiple payment cards and multiple membership cards (e.g., airline loyalty card, hotel loyalty card, gym membership card, etc.) in their pockets, wallets, or pursues. Thus, the available area on the payment cards can be more efficiently used, which can reduce the number of physical payment and membership cards that an individual may need to carry.

Various embodiments of the present disclosure also relate to payment instruments that can access multiple financial accounts and methods for configuring the payment instruments. The embodiments are directed to a payment instrument that allows the user to select which financial account to access based at least in part on a payment method or technique used at a POS terminal. Additionally, the embodiments can include a client application displayed on a client device that can be used for configuring the selection of financial accounts for the payment instrument. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1A:
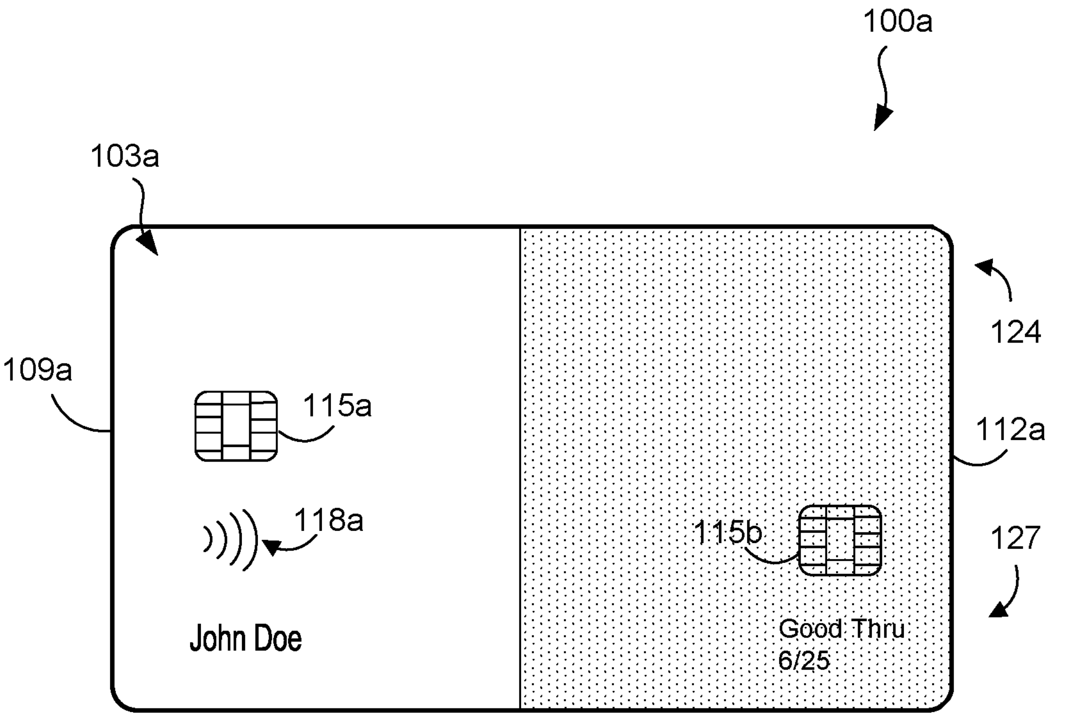
FIGS. 1A-1C are drawings of payment instruments according to various embodiments of the present disclosure.
Figure 1B:
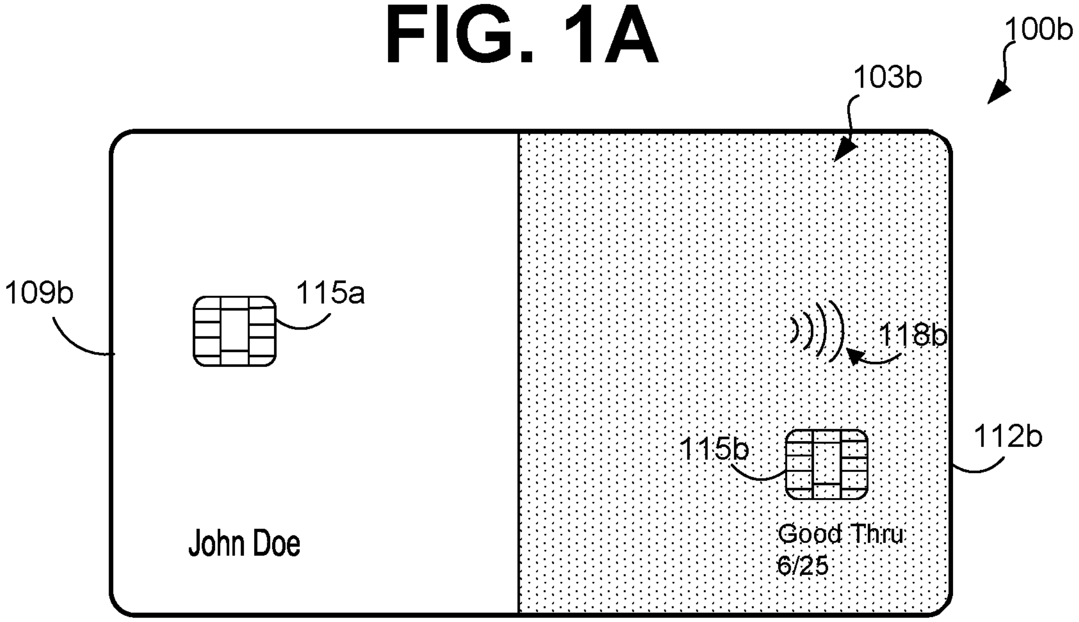
Figure 1C:
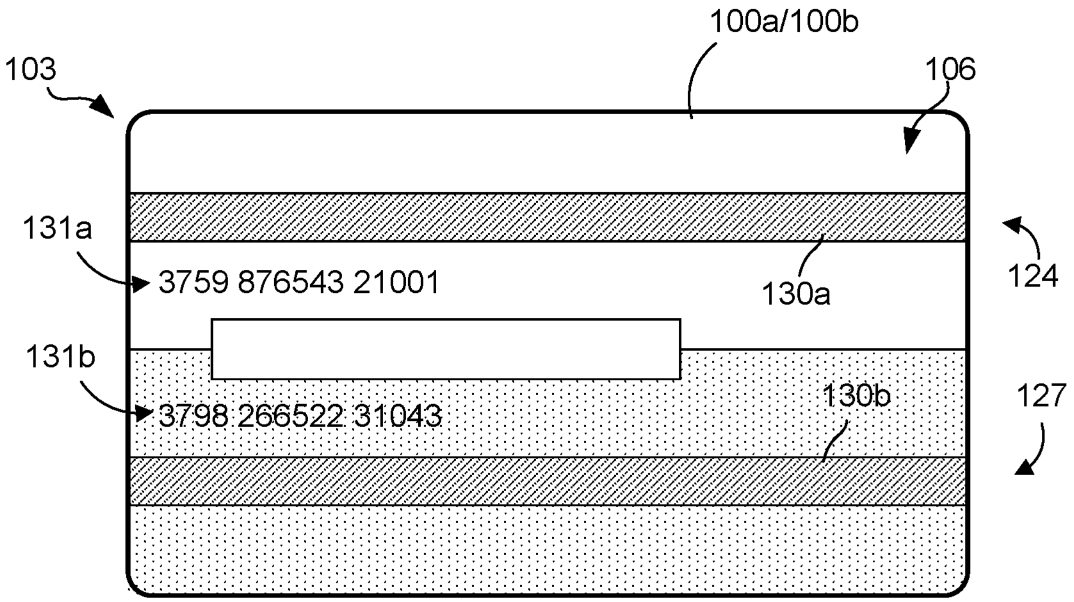

FIGS. 1A and 1B show drawings of a top view of a payment instrument 100*a* and payment instrument 100*b* (generically "the payment instrument 100") for a user. As illustrated in FIG. 1A, the payment instrument 100*a* has a front face 103*a* and a rear face (FIG. 1C). FIG. 1A illustrates that the front face 103*a* of the payment instrument 100*a* can be partitioned into multiple card regions. For example, the payment instrument 100*a* can include a first end 109*a* (e.g., the non-shaded region of the payment instrument 100) and a second end 112*a* (e.g., the shaded region of the payment instrument 100). As shown in FIG. 1A, the first end 109*a* can include a first embedded computing device 115*a* and a contactless indicator 118*a*. The second end 112*a* can include a second embedded computing device 115*b*.

The first embedded computing device 115*a* and the second embedded computing device 115*b* (referred to collectively as "the embedded computing devices 115" and generically as "an embedded computing device 115") can represent a processor, a security chip, integrated circuit (IC) chip, or other suitable processing integrated circuit for authenticating payment transactions at a point-of-sale device. The embedded computing devices 115 can be embedded into a material of the payment instrument 100*a*. The embedded computing devices 115 can be used to authenticate payment transactions according to a payment security protocol, such as the Europay, Mastercard, and Visa (EMV) technical standard. In some embodiments, the embedded computing devices 115 can be used to support a contact payment method (e.g., by dipping or inserting the first end 109*a* or the second end 112*a* of the payment instrument 100*a* into a POS device), a contactless payment method (e.g., tap or position the payment instrument 100*a* in close proximity to the point-of-sale device), and other suitable payment methods. In some examples, the embedded computing devices 115 can be constructed according to ISO/IEC7816, ISO/IEC14443, or other suitable chip payment standards.

In some embodiments, the payment instrument 100 can be configured for contactless payments and can have an antenna that can be electrically coupled or inductively coupled to the first embedded computing device 115*a*. During a contactless transaction, the POS terminal can use electromagnetic induction to induce a current in the antenna of the payment instrument 100. The received current can be used to power the first embedded computing device 115*a* or the second embedded computing device 115*b* for execution of transaction processing. Thus, the contactless payment can be made using near fear communication (NFC), radio frequency identification (RFID), or other suitable wireless protocols that provide transmitted power.

The embedded computing devices 115 can have a memory that stores applications and cryptogram keys. The applications can be executed for a contact transaction (e.g., dipping or inserting the payment instrument 100 into a POS terminal) or a contactless transaction (e.g., positioning the payment instrument 100 in close proximity to the POS terminal). For example, an application can be executed during a contact payment transaction and the application can be executed to obtain transaction data from the POS terminal. The application can use the transaction data and a cryptogram key to generate an application cryptogram for the transaction. The application cryptogram can be provided to the POS terminal for an authorization request. The authorization request can include the application cryptogram and a card identifier for the payment instrument 100. The authorization request can be transmitted to an issuer system. The issuer system can receive the authorization request and can extract the application cryptogram from the authorization request. The issuer system can use stored user preferences for the payment instrument 100 and data (e.g., application cryptogram, card type, card identifier, etc.) from the authorization request for identifying a financial account for processing.

The user preferences can be configured to indicate which financial account to use for a transaction based at least in part on whether the first embedded computing device 115*a*, the second embedded computing device 115*b*, the first magnetic stripe 130*a*, or the second magnetic stripe 130*b* is used at the POS terminal.

For example, in the illustrated embodiment, the first end 109*a* of the payment instrument 100*a* can be used for executing credit transactions at a POS device with the first embedded computing device 115*a*. The first end 109*a* can be linked to a first financial account for a user (e.g., a credit card account for the user). In some non-limiting examples, the first credit card account is fixed to the first embedded computing device 115*a*. The first credit card account can be accessed via a contact payment method (e.g., inserting or dipping the first end 109 into a POS device) or a contactless payment method (e.g., placing the payment instrument in close proximity to the POS device).

As shown in the illustrated embodiment of FIG. 1A, the first embedded computing device 115*a* is located at the first end 109*a* and closer to the top portion 124 of the payment instrument 100. The second embedded computing device 115*b* is located at the second end 112*a* and closer to the bottom portion 127 of the payment instrument 100. The locations of the first embedded computing device 115*a* and the second embedded computing device 115*b* allow for either device to be accessible during a contact transaction (e.g., by dipping or inserting the payment instrument 100) with the POS terminal. As such, the first embedded computing device 115*a* and the second embedded computing device 115*b* can be positioned to avoid a mirror problem, in which the embedded computing device are at mirror locations at opposing ends. Because a contact point in the POS terminal may be located to a side of the payment instrument 100, embedded computing devices 115 located at mirroring location at opposing ends would prevent one embedded computing 115 from being in the correct position once inside of the POS terminal.

The contactless indicator 118 can be a visual indicator that the payment instrument 100 is capable of contactless payment transactions. In this illustrated embodiment in FIG. 1A, the contactless payment transactions can be performed by the first embedded computing device 115*a* because an antenna is electrically coupled or inductively coupled with the first embedded computing device 115*a*.

Next, the second end 112*a* of the payment instrument 100*a* can be used for executing debit transactions at a POS terminal with the second embedded computing device 115*b*. The second end 112*a* can be linked to a second financial account for a user (e.g., a debit card account, a second credit card, a gift card, a charge card, and other financial accounts for the user). In some non-limiting examples, the debit card account can be fixed to the second embedded computing device 115*b*. The debit card account can be accessed via a contact payment method (e.g., inserting the first end 109 into a POS device) or other suitable payment methods. Additionally, the payment instrument 100*a* includes a name of the user and an expiration date on the front face 103*a* of the payment instrument 100*a*.

Next, as illustrated in FIG. 1B, shown is a front face 103*b* of a payment instrument 100*b*. The front face 103*b* of the payment instrument 100*b* is different from the front face 103*a* of the payment instrument 100*a* because the contactless indicator 118*b* is shown on the second end 112*b* of the payment instrument 100*b*. Thus, the contactless payment method can be executed using the second embedded computing device 115*b*. In this embodiment, an antenna is electrically coupled or inductively coupled to the second embedded computing device 115*b*. Accordingly, contactless payments can be performed and charged to a second financial account (e.g., the debit account, a second credit card, a gift card, a charge card).

FIG. 1C illustrates a rear face 106 of a payment instrument 100*a* (FIG. 1A) or payment instrument 100*b* (FIG. 1B). The rear face 106 can include a top portion 124, illustrated by the non-shaded portion, and a bottom portion 127, illustrated by the shaded portion.

The top portion 124 can be allocated for transactions using the first financial account, such as a credit card account. Accordingly, the top portion 124 could include a first magnetic stripe 130*a*, a first financial account number 131*a* (e.g., a credit card account number), and other suitable items. The first magnetic stripe 130*a* can be swiped in a magnetic stripe reader of a POS device in order to access the first financial account number 131*a*, card type data, and other data needed to authorize a transaction.

The bottom portion 127 can be allocated for transactions using the second financial account, such as a debit card account, a second credit card account, a gift card, a loyalty point card, a charge card, and other suitable financial accounts. The bottom portion 127 can include a second magnetic stripe 130*b*, a second financial account number 131*b* (e.g., the debit card account number), and other suitable items. The second magnetic stripe 130*b* can be used in a magnetic stripe reader of the POS device in order to access the second financial account number 131*b*. As a result, a different orientation of the payment instrument 100 can be used to access a different financial account at a POS device.

Figure 2:
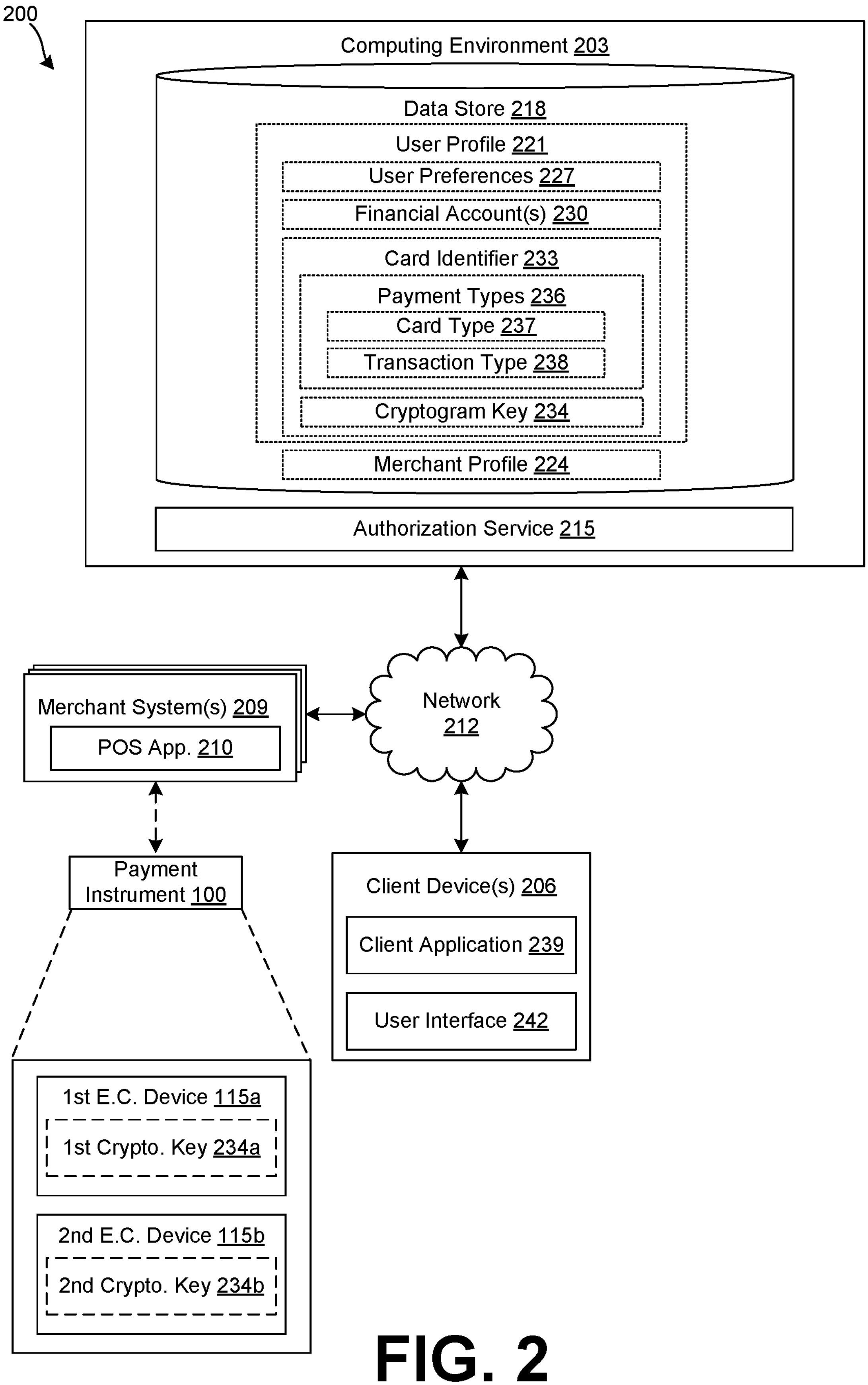
FIG. 2 is a drawing of a network environment according to various embodiments of the present disclosure.

With reference to FIG. 2, shown is a network environment 200 according to various embodiments. The network environment 200 can include a computing environment 203, a client device 206, and a merchant system 209, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 can include an authorization service 215, and other applications, services, processes, systems, engines, or functionality not discussed in detail herein.

The authorization service 215 can be executed to authorize purchase transactions for a payment instrument 100 of a user. The authorization service 215 can be used to store and update user preferences for accessing financial accounts associated with a payment instrument 100.

Also, various data is stored in a data store 218 that is accessible to the computing environment 203. The data store 218 can be representative of a plurality of data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 218 is associated with the operation of the various applications or functional entities described below. This data can include a user profile 221, a merchant profile 224, and potentially other data.

The user profile 221 can represent a profile or an account for a user at a financial institution, such as a bank, a credit company, a credit union, and other suitable financial entities. The user profile 221 can include user preferences 227, financial accounts 230, a card identifier 233, and other suitable data.

The user preferences 227 can represent a configurable arrangement of financial accounts 230 that are accessible via certain payment mechanisms using the payment instrument 100. In a first example of an initial configuration, the user can set a user preference that the first embedded computing device 115*a* and the first magnetic stripe 130*a* are assigned a first financial account 230. The second embedded computing device 115*b* and the second magnetic stripe 130*b* can be assigned a second financial account 230.

In a second example of an initial configuration, the user can set a preference that the first embedded computing device 115*a* is used for a first financial account 230, a second embedded computing device 115*b* is used for a second financial account 230, a first magnetic stripe 130*a* is used for a third financial account 230, a second magnetic stripe 130*b* is used for a fourth financial account 230, and other suitable configurations.

Subsequently, after the initial configuration, the user can alter the user preferences 227 to include different financial accounts 230, and alter which payment mechanisms (e.g., via a first embedded computing device 115*a*, a second embedded computing device 115*b*, a first magnetic stripe 130*a*, a second magnetic stripe 130*b*, etc.) are used to access a financial account 230, and other suitable modifications. The user preferences 227 can be set or updated by the client device 206. In some embodiments, the user preferences 227 can be selected by the user, by the financial organization before the payment instrument 100 is mailed to the user, or in other suitable scenarios.

The financial accounts 230 can represent the various financial account numbers associated with the user. The financial accounts 230 can include credit card accounts, debit accounts, gift card accounts, loyalty point accounts, membership accounts, or other suitable accounts. In some embodiments, the computing environment 203 is associated with a particular financial entity and the user has certain financial accounts 230 that are maintained by the computing environment 203. Financial accounts 230 from other organizations can also be added to the user profile 221, such as airline loyalty point accounts, a loyalty account for a retail store, or other suitable accounts.

The card identifier 233 can represent a unique identifier for a payment instrument 100. The card identifier 233 can include cryptogram keys 234, payment types 236 available for the payment instrument 100, and other suitable data associated with payment instrument 100. The cryptogram key 234 can represent a unique cryptogram key that is stored in memory for each embedding computing device (e.g., the first embedded computing device 115*a*, the second embedded computing device 115*b*, etc.). For example, a payment instrument 100 can have two cryptogram keys 234, in which a first cryptogram key 234*a* is stored in memory of the first embedded computing device 115*a* and a second cryptogram key 234*b* is stored in memory of the two embedded computing device 115*b*. The cryptogram keys 234 can be used to identify which embedded computing device on the payment instrument 100 was used and for authenticating the transaction. In some embodiments, the cryptogram keys 234 are not transmitted over the network 212. Instead, cryptogram data generated using the cryptogram keys 234 can be transmitted by the POS terminal to the computing environment 203 for authorization.

The payment type 236 can describe available payment mechanisms on the payment instrument 100 and a location of the payment mechanism on the payment instrument 100. The payment type 236 can be used to identify the selected financial account 230 to use for a transaction. The payment types 236 can include card types 237, transaction types 238, and other suitable data.

A card type 237 can represent an indication whether the payment instrument 100 is a configurable type, a non-configurable a type, a membership type, and other suitable card types. A configurable card type can represent a payment instrument 100 in which the financial accounts 230 can be modified by the user at any time (e.g., after activation of the payment instrument 100). A non-configurable card type can represent a payment instrument 100 that cannot reconfigure the financial accounts 230 after the activation of the payment instrument 100. A membership type can represent a payment instrument 100 that is associated with one or more membership accounts (e.g., loyalty point account, gym membership) for the user.

A transaction type 238 can represent a combination of a card terminal and a card region of the payment instrument 100. The card terminal can represent a payment technology type or payment mode, such as a magnetic payment stripe, a contact payment with a security chip, a contactless payment, an online payment, and other suitable payment methods. The card region can represent a location on the payment instrument in which the card terminal is located, such as at a first end 109*a*, a second end 112*a*, a top portion 124, a bottom portion 127, a central location (e.g., see FIG. 3A), or other suitable locations on the payment instrument 100. Additionally, the transaction type 238 can include an identifier for card terminal. For example, the transaction type 238 can include a magnetic stripe identifier for distinguishing the first magnetic stripe 130*a* from the second magnetic stripe Different payment instruments 100 can have different payment types 236 that are available. For example, a first payment instrument 100 can include a first embedded computing device 115*a*, a second embedded computing device 115*b*, a first magnetic stripe 130*a*, a second magnetic stripe 130*b*, a contactless payment, an online payment option, or other suitable payment types that can be executed with the payment instrument 100.

In another example, a second payment instrument 100 may include fewer options. For example, the second payment instrument 100 may omit magnetic payment stripes. Thus, the second payment instrument 100 may include just, for example, a first embedded computing device 115*a*, a second embedded computing device 115*b*, and a contactless payment option. Accordingly, the user preferences 227 can include a mapping of financial accounts 230 to the available payment types 236 for a payment instrument 100.

The merchant profile 224 can represent data associated with merchant system 209 and POS devices associated with the merchant system 209. Additionally, the merchant profile 224 can include data from authorization requests received from the merchant system 209, transaction authorizations sent to the merchant system 209, or other suitable data.

The client device 206 is representative of a plurality of client devices that can be coupled to the network 212. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a client application 239 or other applications. The client application 239 can be executed to communicate with the authorization service 215. The client application 239 can display user interfaces 242 for setting and updating user preferences 227. Additionally, the client application 239 can be used to display and access membership data associated with third party providers.

Additionally, the client application 239 can be executed in a client device 206 to access network content served up by the computing environment 203 or other servers, thereby rendering a user interface 242 on the display. To this end, the client application 239 can include a browser, a dedicated application, or other executable, and the user interface 242 can include a network page, an application screen, or other user mechanisms for obtaining user input. The client device 206 can be configured to execute applications beyond the client application 239 such as email applications, social networking applications, word processors, spreadsheets, or other applications.

The merchant system 209 can represent the various components of a merchant for processing transactions in person at physical store location and online via a merchant website. Point-of-Sale (POS) devices located at a physical retail store location and merchant websites can use a POS application 210 to accept a payment instrument 100 for processing a purchase of goods and services. The POS application 210 can identify a particular payment instrument 100, a payment type 236, or other suitable conditions for processing the purchase.

Next, a general description of the operation of various components of the network environment 200 is provided. To begin, a user can request a payment card from a financial organization. In a first scenario, the organization can send the user a payment instrument 100 with non-configurable financial accounts 230. Non-configurable, in this context, represents a payment instrument 100 in which the financial accounts 230 cannot be reconfigured after the user has activated or received the payment instrument 100. In some examples, the set of financial accounts 230 linked to the non-configurable payment instrument 100 can be selected before being sent to the user. However, the user cannot subsequently reconfigure the financial accounts 230 for the payment instrument 100.

In this scenario, the user can approach a POS terminal in a store for a purchase. The user can insert the second end 112 of the payment instrument 100 and the POS terminal can access the second embedded computing device 115*b* for a contact payment. Alternatively, the user can swipe the second magnetic stripe 130*b* of the payment instrument 100 with a magnetic stripe reader.

The POS terminal can capture a debit financial account 230 from the second magnetic stripe 130*b* or a first application cryptogram from the second embedded computing device 115*b*. The POS terminal can transmit the debit financial account 230 or the first application cryptogram to the authorization service 215 for authorization. Instead of a debit financial account 230, the captured financial account can be credit card account, a gift card account, a loyalty point account, and other suitable financial accounts in this non-limiting example.

Alternatively, the user can insert the first end 109 of the payment instrument 100 into the POS terminal. The POS terminal can capture a credit financial account 230 from the first magnetic stripe 130*a* or a second application cryptogram from the first embedded computing device 115*a*. Instead of a credit financial account 230, the captured financial account can be debit card account, a gift card account, a loyalty point account, and other suitable financial accounts in this non-limiting example.

In a second example scenario, the organization can send to the user a payment instrument 100 with configurable financial accounts 230. Configurable in this context represents a payment instrument 100 that the user can configure financial accounts 230 at any time. As such, the user can select a first set of financial accounts 230 linked to the payment instrument 100 at a first instance and can select a second set of financial accounts 230 linked to the payment instrument at a second instance.

In this second scenario, the user can use the client application 239 to store user preferences 227 to represent the selection of financial accounts 230 in the computing environment 203. For example, the user can select that the first embedded computing device 115*a* and the first magnetic stripe 130*a* are assigned a first financial account 230. The second embedded computing device 115*b* and the second magnetic stripe 130*b* can be assigned a second financial account 230. Subsequently, the user can update the selection of financial accounts 230 for the payment instrument 100.

Figure 3A:
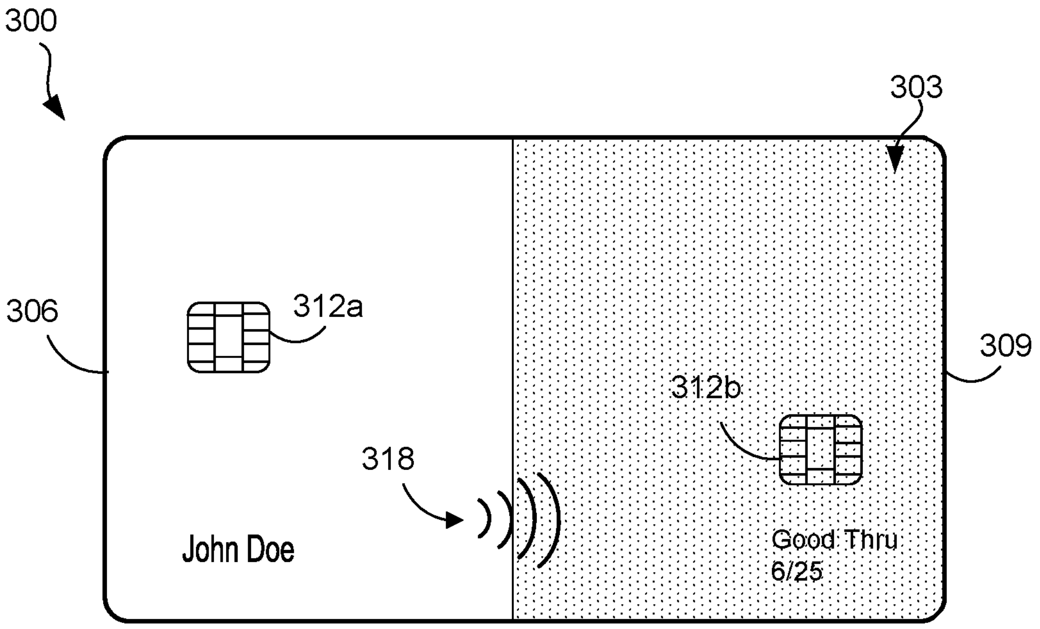
FIGS. 3A-3B are drawings of payment instruments according to various embodiments of the present disclosure.

Referring next to FIG. 3A, shown is an example of a configurable payment instrument 300. FIG. 3A illustrates a front face 303 that includes a first end 306 (e.g., the non-shaded region of the configurable payment instrument 300) and a second end 309 (e.g., the shaded region). As shown in FIG. 3A, the first end 306 can include a first configurable computing device 312*a* and the second end 309 can include a second configurable computing device 312*b* (collectively "the configurable computing devices 312"). The configurable computing devices 312 can be embedded into the material of the configurable payment instrument 300. Similar to aspects of the payment instrument 100, the configurable computing device 312 can represent a processor, a security chip, integrated circuit (IC) chip, or other suitable processing integrated circuit for authenticating payment transactions at a point-of-sale device. The configurable computing devices 312 can be used to authenticate payment transactions according to a payment security protocol, such as the Europay, Mastercard, and Visa (EMV) technical standard. In some embodiments, the configurable computing device 312 can be used to support a contact payment method (e.g., by dipping or inserting the first end 109 of the payment instrument 300 into a POS device), a contactless payment method (e.g., tap or position the payment instrument 300 in close proximity to the point-of-sale device), or other suitable payment methods.

The configurable computing devices 312 can have a memory that stores applications and cryptogram keys 234. The applications can be executed for a contact transaction or a contactless transaction. For example, an application can be executed during a contact payment transaction (e.g., by dipping or inserting the payment instrument 100 into the POS terminal). The application can be executed to obtain transaction data from the POS terminal. The application can use the transaction data and a cryptogram key to generate an application cryptogram for the transaction. The application cryptogram can be provided to the POS terminal for an authorization request. In some examples, the first configurable computing device 312*a* can be assigned to a first financial accounts 230 by the user. The first financial account 230 selected for the first configurable computing device 312*a* can be stored in the user preference 227 and the selection can be updated over time. The second configurable computing device 312*b* can be assigned to a second financial account 230 by the user. The second financial account 230 selected to be assigned to second configurable computing device 312*b* can be stored in the user preferences 227 and the selection can be updated over time.

The front face 303 of the configurable payment instrument 300 can include a contactless payment indicator 318. In FIG. 3A, the contactless payment indicator 318 signifies that the configurable payment instrument 300 is capable of contactless transactions The contactless payment indicator 318 can represent that the configurable payment instrument 200 has an embedded antenna. The embedded antenna can be electrically coupled or inductively coupled to either the first configurable computing device 312*a* or the configurable computing device 312*b*.

Figure 3B:
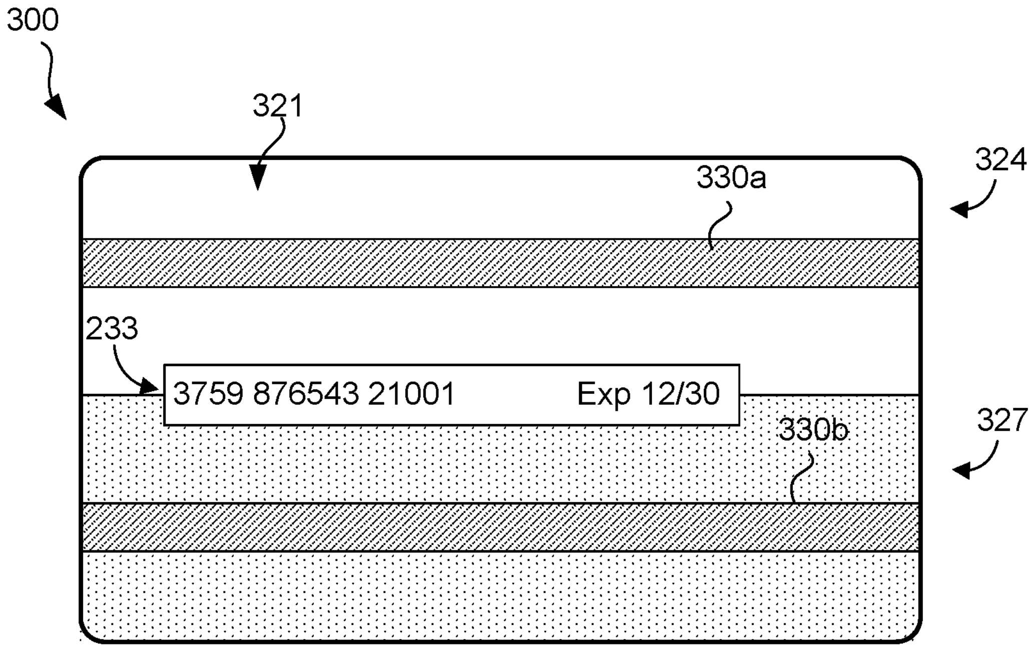

Turning now to FIG. 3B, shown is a rear face 321 of the configurable payment instrument 300. The rear face 321 includes a top portion 324 (e.g., the shaded region) and a bottom portion 327 (e.g., the shaded region). The top portion 324 includes a first magnetic stripe 330*a* and the bottom portion 327 includes a second magnetic stripe 330*b*. The first magnetic stripe 330*a* and the second magnetic stripe 330*b* (collectively "the magnetic stripes 330" and generically "a magnetic stripe 330") can each be individually configured to a financial account 230 that is selected by the user. The selections can be stored as user preferences 227.

The rear face 321 includes a card identifier 233 that uniquely identifies the configurable payment instrument 300 for the user. In some embodiments, the card identifier 233 can be captured by the POS device during a transaction. The POS device can generate authorization requests that include the card identifier 233, a payment type 236, merchant data associated with the POS device, and/or other suitable data.

Figure 3C:
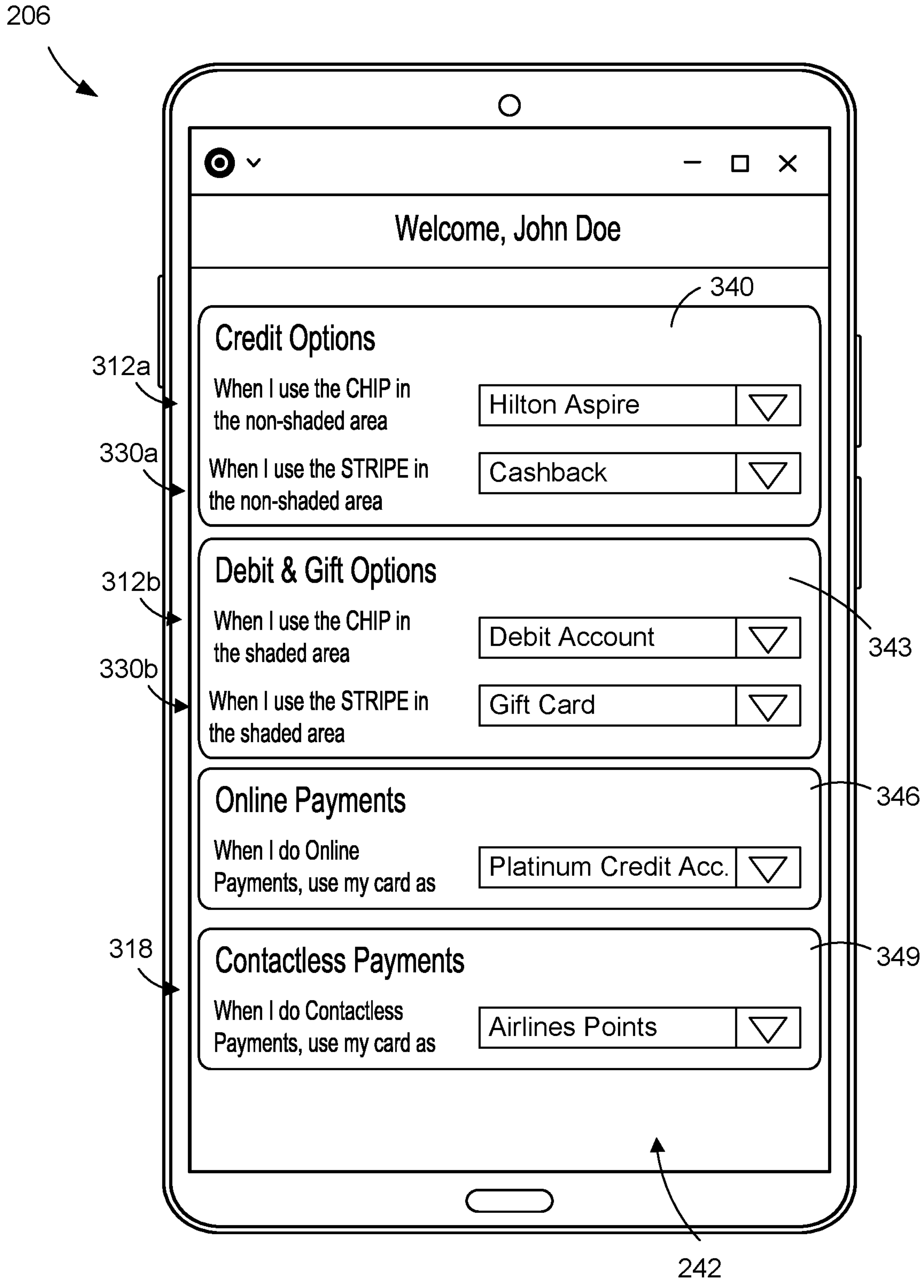
FIG. 3C is an illustration of a user interface for a client device according to various embodiments of the present disclosure.

Moving on to FIG. 3C, shown is a user interface 242 displayed on a client device 206. The user interface 242 can be displayed upon executing the client application 239. As shown, the user interface 242 can be used to configure user preferences 227 for the configurable payment instrument 300 shown in FIGS. 3A and 3B.

The user interface 242 can include many different sections. For example, the user interface 242 could include a credit option section 340, a debit & gift option section 343, an online payment section 346, and a contactless payment section 349. The credit option section 340 can include a first option for selecting a financial account 230 for the first configurable computing device 312*a* and a second option for selecting a financial account 230 for the first magnetic stripe 330*a*.

The debit & gift option section 343 can include a third option for selecting a financial account 230 for the second configurable computing device 312*b* and a fourth option for selecting a financial account for the second magnetic stripe 330*b*.

The online payment section 346 can include a fifth option for selecting a financial account 230 for online transactions using the configurable payment instrument 300. The contactless payment section 349 can include a sixth option for selecting a financial account 230 for the contactless payment transactions performed with the configurable payment instrument 300.

As shown in the FIG. 3C, the selected financial accounts 230 for the payment types 236 (e.g., first configurable computing device 312*a*, the second configurable computing device 312*b*, the first magnetic stripe 330*a*, the second magnetic stripe 330*b*, contactless payments, online payments) can include a hotel membership account, a cashback account, a debit account, a gift card account, a platinum credit account, an airline loyalty points account, or other suitable accounts. Additionally, the user can display the user interface 242 to alter the arrangement of selected financial accounts to payment types 236 on the configurable payment instrument 300 at various times.

In another example for FIG. 3C, the user can select a first financial account 230 for the credit option section 340 (e.g., first configurable computing device 312*a* and the first magnetic stripe 330*a*) and can select a second financial account 230 for the debit option section 343 (e.g., second configurable computing device 312*b* and the second magnetic stripe 330*b*). Thus, in this non-limiting example, the user has two financial account selections instead of four selections as described in the previous example. Accordingly, the selection of the first financial account 230 can be assigned to the first configurable computing device 312*a* and the first magnetic stripe 330*a*. The selection of the second financial account 230 can be assigned to the second configurable computing device 312*b* and the second magnetic stripe 330*b*. Further, the financial account selection for the contactless payment 349 can be assigned to either the first financial account 230 or the second financial account 230, in which the assignment can be determined according to the embedded antenna configuration for the configurable payment instrument 300.

In some examples, the POS application 210 can generate and transmit an authorization request to the authorization service 215. The authorization request can include data for the transaction type 238. The transaction type 238 can indicate whether the transaction is a magnetic stripe payment, an online payment, a contact payment (e.g., EMV security chip), a contactless payment, and other suitable types. Thus, the transaction type 238 can be used to identify the appropriate financial account for at least the online payment section 346 and the contactless payment section 349 during a transaction.

In the event of a magnetic stripe payment (e.g., indicated in the transaction type 238), the authorization request can include a magnetic stripe identifier that enables the authorization service 215 to distinguish between the first magnetic stripe 330*a* and the second magnetic stripe 330*b*. Thus, a first magnetic stripe identifier can be associated with a first financial account (see e.g., 330*a* in FIG. 3C) and a second magnetic stripe identifier can be associated with a second financial account (see e.g., 330*b* in FIG. 3C).

Additionally, in the event of a contact payment (e.g., indicated in the transaction type 238), the authorization request can include an application cryptogram. The first configurable computing device 312*a* and the second configurable computing device 312*b* can each store a unique cryptogram key on the configurable payment instrument 300, which can be used by the POS application 210 to generate the application cryptogram. Thus, the authorization service 215 can identify whether the first configurable computing device 312*a* or the second configurable computing device 312*b* was used during a transaction by verifying or matching the provided application cryptogram with one of the two stored cryptogram keys associated with the card identifier 233 at the computing environment 203.

Figure 4:
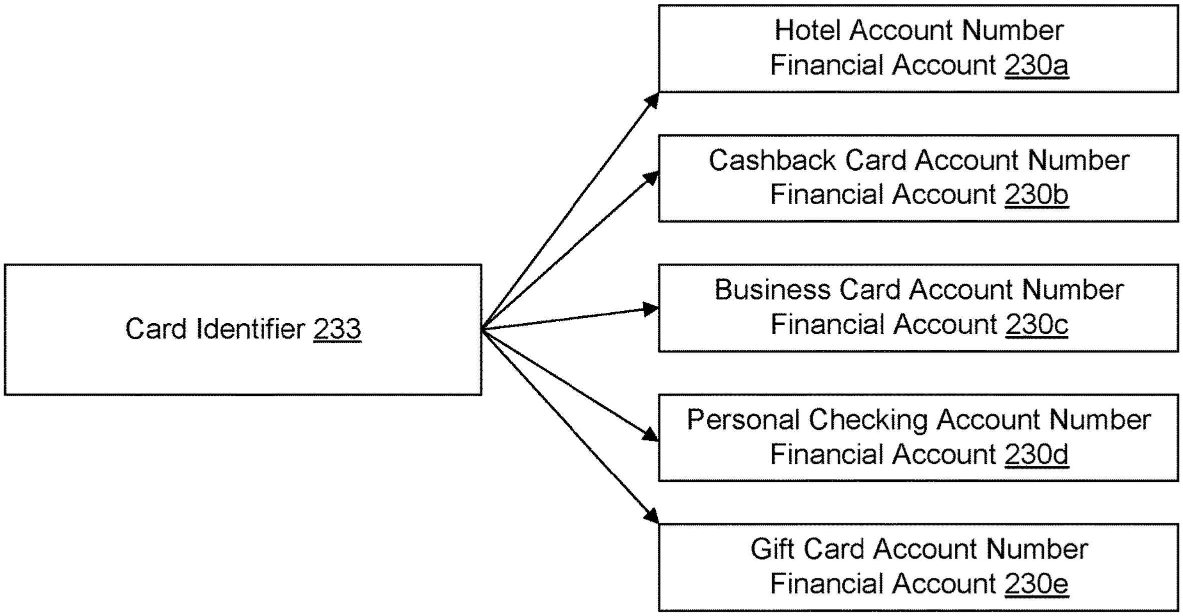
FIG. 4 is an illustration of a mapping of a card identifier of a payment instrument and multiple financial accounts according to various embodiments of the present disclosure.

FIG. 4 illustrates a drawing of the card identifier 233 that is mapped to multiple financial accounts 230 *a-e* (collectively "the financial accounts 230" and generically "a financial account 230") associated with a user. The financial accounts 230 can represent the financial accounts 230 stored in the user profile 221 of the user. As illustrated, the financial accounts 230 can be associated with different financial entities and organizations. For example, the financial account 230*a* can be associated with a hotel entity and the financial account 230*b* can be associated with a bank institution.

Figure 5:
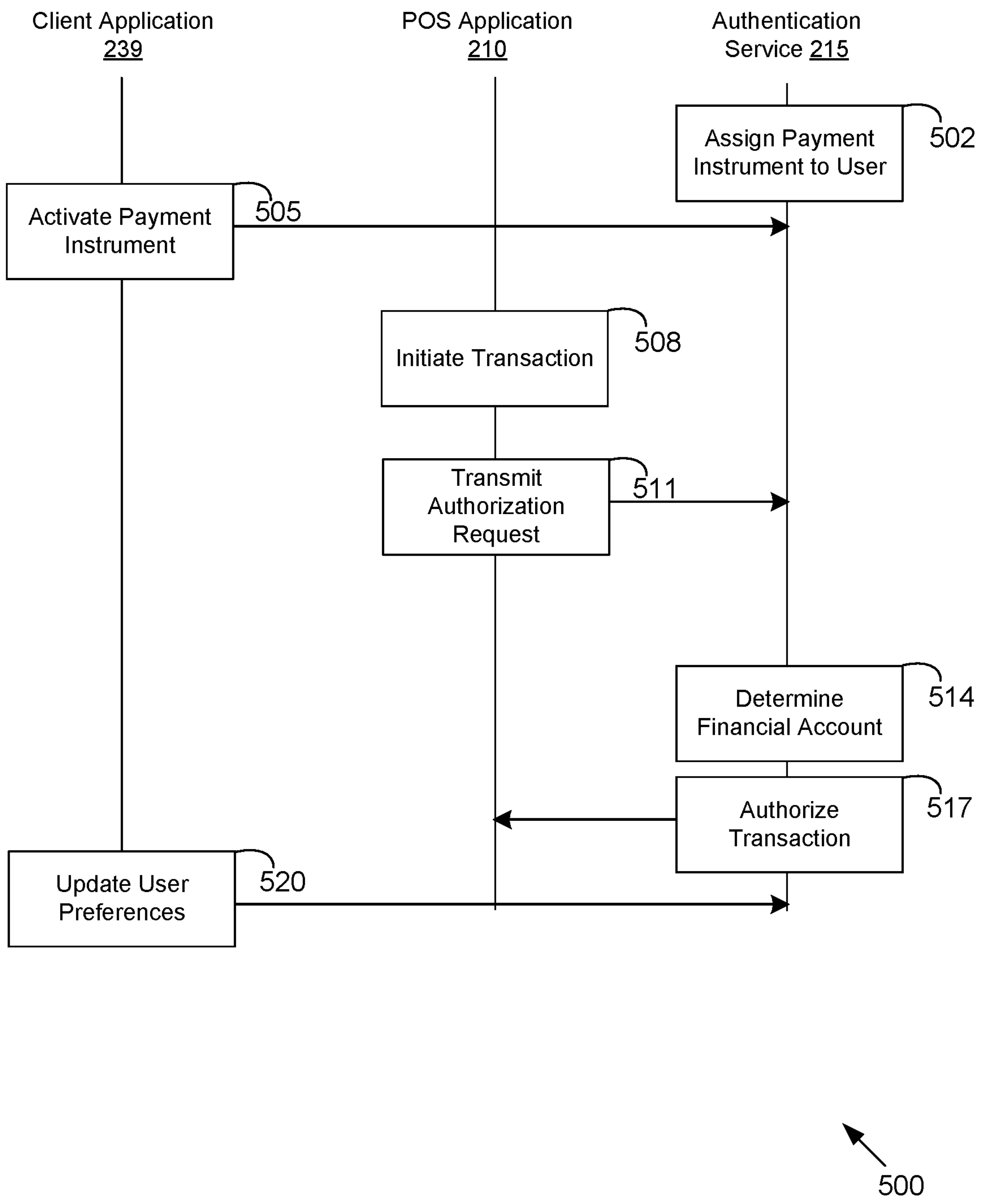
FIG. 5 is a sequence diagram illustrating an example of the interactions between the various components of the network environment of FIG. 2 according to various embodiments of the present disclosure.

Moving on to FIG. 5, shown is a sequence 500 of operations performed in the network environment 200 (FIG. 2). It is understood that the sequence diagram of FIG. 5 provides merely an example of the many different types of interactions that can occur between the depicted components of the network environment 200. As an alternative, the sequence diagram of FIG. 5 may be viewed as depicting an example of elements of a method implemented in the network environment 200 (FIG. 2) according to one or more embodiments. Additionally, although the payment instrument 100 is included in the following discussion, other payment instruments (e.g., configurable payment instrument 300) described in the present disclosure could be used.

In box 502, the authorization service 215 can assign a payment instrument 100 to a user. The payment instrument 100 can have a card identifier 233. In some scenarios, the payment instrument 100 can be mailed to the user at their home or business for activation. In some embodiments, the payment instrument 100 can be assigned initially to two or more financial accounts 230 of the user, in which each financial account 230 is accessible at a different card terminal (e.g., first configurable computing device 312*a*, second configurable computing device 312*b*, a first magnetic stripe 330*a*, second magnetic stripe 330*b*) of the payment instrument 100.

In box 505, the client application 239 can be used to activate the payment instrument 100. In some examples, the activation can include setting user preferences 227. For instance, when the card type 237 is configurable (e.g., configurable payment instrument 300), the client application 239 can display a user interface 242 for receiving a selection of financial accounts 230 that are assigned to different payment types 236 (e.g., magnetic stripes 330, configurable computing devices 312, etc.). In other instances, a financial service provider associated with the computing environment 203 can assign a financial account 230 to each payment types 236 before the user receives the payment instrument 100.

In box 508, the POS application 210 can initiate a transaction of goods or services after a payment instrument 100 has been presented. The transaction can be initiated at a POS device or an online website of a merchant. The POS application 210 can extract transaction data and data associated with the payment instrument 100 for the transaction. In some examples, the POS application 210 can extract a card identifier 233 and other data associated with the payment instrument 100 based at least in part on user interactions with the POS device. For instance, the extracted data can include a card type 237 (e.g., configurable, or non-configurable payment instrument), a transaction type 238, cryptogram data, and other suitable payment instrument data. In one non-configurable scenario, the POS application 210 can extract cryptogram data from a first embedded computing device 115*a* when the first embedded computing device 115*a* is inserted in the POS device. The first embedded computing device 115*a* can generate the cryptogram data based at least in part on a first cryptogram key 234*a*. The generated cryptogram data can be used to identify a first financial account 230 at the computing environment 203.

In another non-configurable scenario, the user can use a second magnetic stripe 130*b* of the payment instrument 100 at the POS device for a transaction. The POS application 210 can extract a second financial account 230 from the payment instrument 100, a card type 237, and/or other suitable payment instrument data. The second financial account 230 can be used for the transaction.

In box 511, the POS application 210 can generate and transmit an authorization request to the authorization service 215. The authorization request can include the card identifier 233, transaction data, extracted data from the payment instrument 100 (e.g., cryptogram data), and/or other suitable data.

In box 514, the authorization service 215 can determine a financial account 230 for evaluating authorization of the transaction. In some examples, based on the card identifier 233, the authorization service 215 can determine the card type 237, such as a configurable card (FIGS. 3A-3C), non-configurable card (FIGS. 1A-1C), membership card (FIG. 6A), and other suitable card types. For instance, the card identifier 233 can have character-string conventions for distinguishing different card types 237. Additionally, the authorization service 215 can identify the payment type 236 (e.g., a magnetic stripe transaction, a contact/contactless transaction, etc.) from the authorization request.

If the card type 237 is non-configurable, then the authorization service 215 can identify the financial account 230 in the authorization request in some examples. In other examples, the authorization service 215 can determine the financial account 230 based at least in part on the card identifier 233 and extracted payment instrument data (e.g., a magnetic stripe identifier, cryptogram data, etc.). The card identifier 233 and the extracted payment instrument data can be used to identify the financial account 230 for the transaction based at least in part on the user preferences 227.

In another example, if the card type 237 is configurable, the authorization service 215 can determine a selection for a financial account 230 in the user preferences 227. The user preferences 227 can include a mapping of a transaction type 238 (e.g., a particular magnetic stripe 330, a particular configurable computing device 312) to a selection of a particular financial account 230.

In box 517, the authorization service 215 can evaluate whether to authorize the transaction for the selected financial account 230. For example, the authorization service 215 can evaluate whether there are sufficient funds in the financial account 230 and other conditions. If the authorization service 215 determines to approve the transaction, the authorization service 215 can transmit an authorization notification to the POS application 210. In some examples, the authorization notification can include the selected financial account 230 used for the transaction instead of or in addition to the card identifier 233.

In box 520, the client application 239, at a subsequent point in time, can be used to update the user preferences 227 when the user wants a different configuration of financial accounts 230 for a configurable payment instrument 300. The client application 239 can provide an updated mapping of financial accounts 230 to transaction types 238 (e.g., first configurable computing device 312*a*, second configurable computing device 312*b*, first magnetic stripe 330*a*, second magnetic stripe 330*b*). The updated user preferences 227 can be stored with the authorization service 215.

Figure 6A:
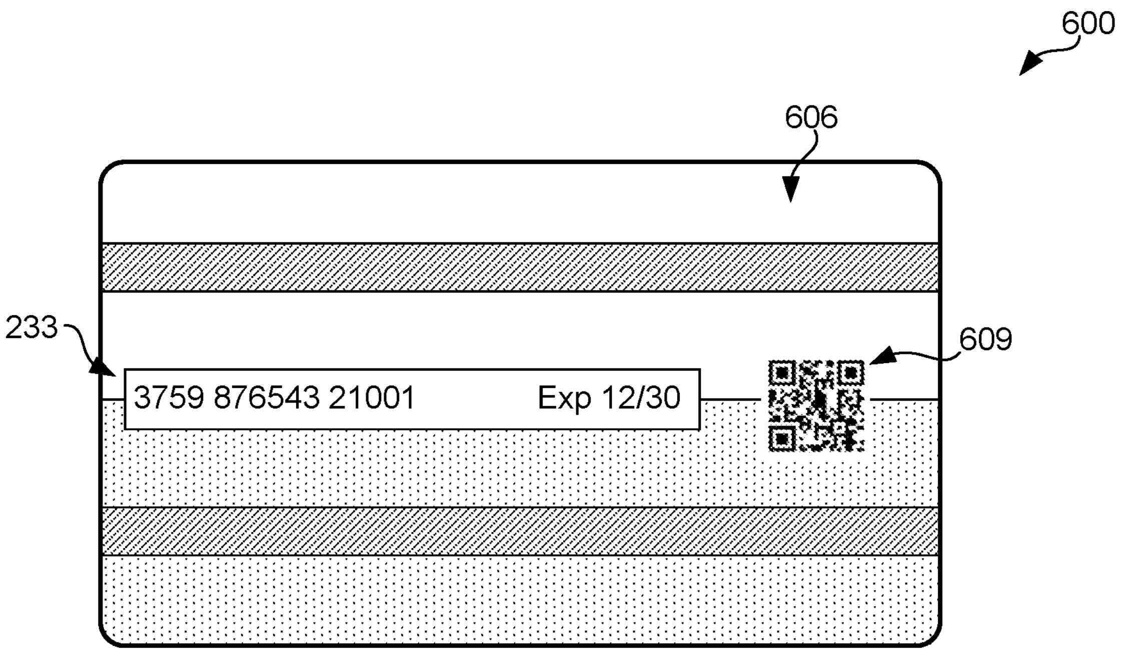
FIGS. 6A-6B are drawings of payment instruments according to various embodiments of the present disclosure.

Next, FIG. 6A illustrates a payment instrument 600 that enables access to membership account information at various membership providers. FIG. 6A illustrates a rear face 606 of the payment instrument 600. The front face of the payment instrument 600 can includes similar aspects to payment instrument 100 or configurable payment instrument 300

As shown, the rear face 606 of the payment instrument 600 includes similar components to the rear face 321 of the configurable payment instrument 300. In addition, the rear face 606 also includes a bar code 609. The bar code 609 can be a two-dimensional bar code, such as quick response (QR) code. The bar code 609 can have an embedded hyperlink that launches the client application 239 on the client device 206. For example, the bar code 609 can be captured using a camera application executed on the client device 206. The camera application can launch the client application 239, which causes a user interface 242 (FIG. 6B) to be displayed on the client device. The user interface 242 can be displayed to present financial accounts 230 with membership features associated with the card identifier 233. The activation of the bar code 609 can cause the client application 239 to retrieve the financial accounts 230 with membership features. The financial accounts 230 with the membership features can be displayed.

Figure 6B:
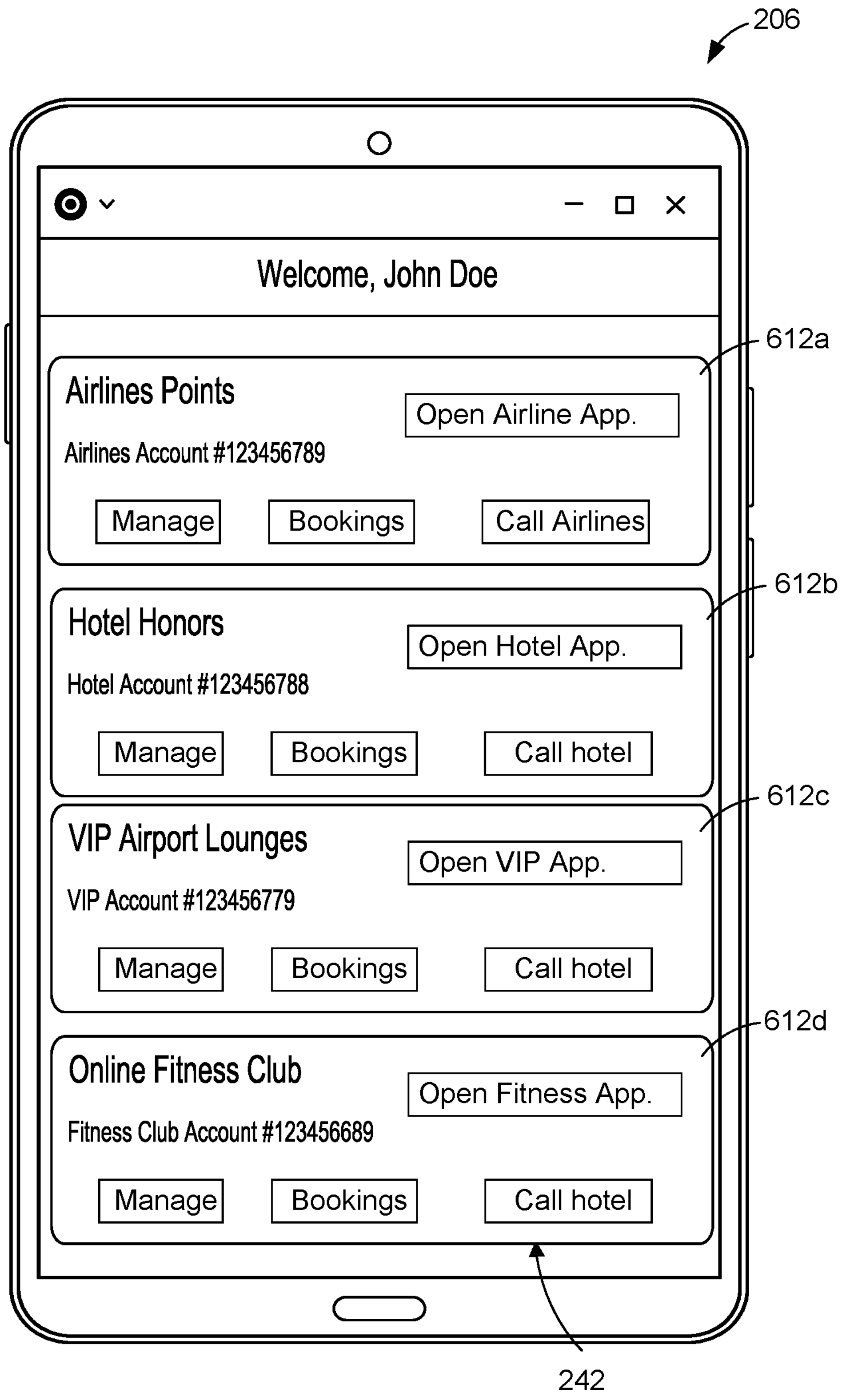

Moving on to FIG. 6B, shown is a user interface 242 that presents a list of financial accounts 230 with membership features. The user interface 242 displays multiple user interface sections 612*a-d* of financial accounts 230 with membership features. For example, some user interface sections 612 include user interface components for launching a mobile application associated with the financial account 230, calling the financial entity associated with the financial account 230, making a reservation for the user with the entity, managing membership benefits, and other suitable membership features.

Figure 7:
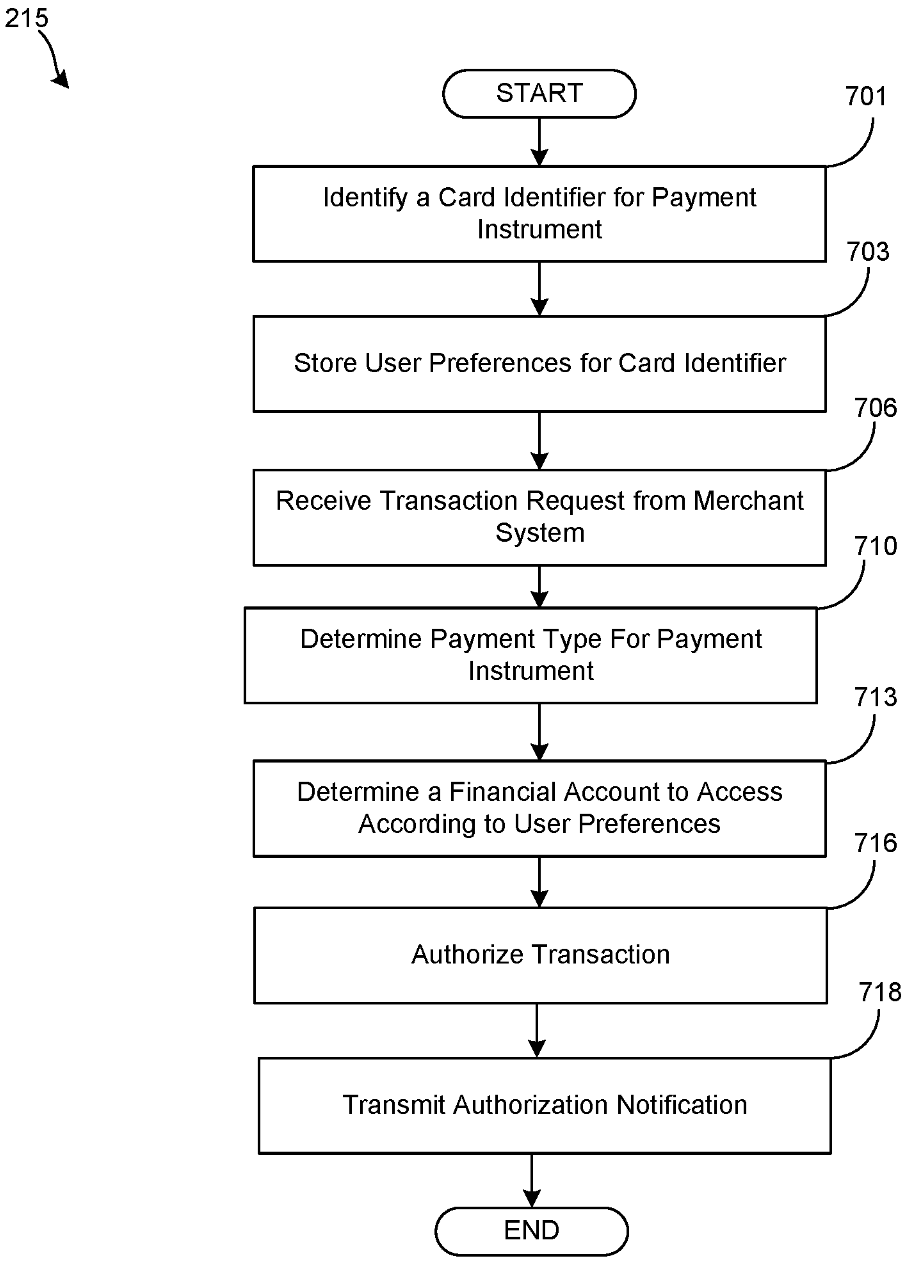
FIG. 7 is a flowchart illustrating one example of functionality implemented as portions of a client application executed in a computing environment in the network environment of FIG. 2 according to various embodiments of the present disclosure.

Referring next to FIG. 7, shown is a flowchart that provides one example of the operation of a portion of the authorization service 215. The flowchart of FIG. 7 provides merely an example of the many different types of functional arrangements that can be employed to implement the operation of the depicted portion of the authorization service 215. As an alternative, the flowchart of FIG. 7 can be viewed as depicting an example of elements of a method implemented within the network environment 200. Although the payment instrument 100 is discussed below, the flowchart of FIG. 7 can be applicable to other payment instruments discussed throughout the present disclosure (e.g., the configurable payment instrument 300, the payment instrument 600, etc.).

Beginning with block 701, the authorization service 215 can identify a card identifier 233 for a payment instrument 100. In some examples, the client device 206 can transmit the card identifier 233 to the authorization service 215 for setting up or updating user preferences 227 (e.g., for a configurable payment instrument 300). In another example, the payment instrument 100 can be manufactured and assigned to a user. The authorization service 215 can identify the card identifier 233 for the payment instrument 100 in order to configure the payment instrument 100 for the customer.

In box 703, the authorization service 215 can store user preferences 227 for the card identifier 233. In some examples, the client application 239 can send user preferences 227 that have been received from the user. The authorization service 215 can store the user preferences 227 in the user profile 221. The user preferences 227 can include a mapping of individual payment types 236 (e.g., magnetic stripes 130, embedded computing device 115, etc.) to an individual financial account 230.

As a non-limiting example, a user preference 227 of the user can include a mapping the first embedded computing device 115*a* on the first end 109 and the first magnetic stripe 130*a* linked to a first financial account 230, such as a personal credit account number. The second embedded computing device 115*b* on the second end 112*a* and the second magnetic stripe 130*b* linked to a second financial account 230, such as a personal debit account number. Accordingly, instead of carrying two different payment cards, the user can carry one payment instrument 100 and still access two different financial accounts 230.

In another non-limiting example, a user preference 227 of the user can include a mapping the first embedded computing device 115*a* on the first end 109 (e.g., labeled "Credit") linked to a first financial account 230, such as a personal credit account number. The second embedded computing device 115*b* on the second end 112 (e.g., labeled "Debit") can be linked to a second financial account 230, such as a personal debit account number. The first magnetic stripe 130*a* on the top portion 124 can be linked to a third financial account 230, such as a business credit account number. The second magnetic stripe 130*b* on the bottom portion 127 can be linked to a fourth financial account 230, such as a business checking account. Accordingly, instead of carrying four different payment cards, the user can carry one payment instrument 100 and still access four different financial accounts 230.

In box 706, the authorization service 215 can receive a authorization request from a merchant system 209. The authorization request can be generated when the user uses their payment instrument 100, for example at a POS device or at an online website. For example, at the POS device, the user may swipe a magnetic stripe 130, initiate a contact payment, or initiate a contactless payment while at a brick-and-mortar store. In some embodiments, the data transmitted in the authorization request can vary according to the payment instrument 100 used for the transaction.

In box 710, the authorization service 215 can determine a payment type 236 and/or a card type 237 associated with the payment instrument 100 used for the authorization request. In some examples, the authorization service 215 can identify a card type 237 from the card identifier 233 based at least in part on a character-string convention. For instance, non-configurable payment instrument 100 may include certain alphanumeric characters or a sequence of alphanumeric characters. A configurable payment instrument 300 may be identified from different alphanumeric a character or a different alphanumeric sequence in the card identifier 233.

In other examples, the authorization service 215 can identify a card type 237 from the authorization request, in which the POS application 210 may capture the card type 237. The authorization request can include other data associated with the payment type 236. In some embodiments, the authorization service 215 can determine a payment type 236 from the data included in the authorization request. For example, if the authorization request includes cryptogram data, then the authorization service 215 can determine that a contact/contactless payment transaction occurred. If the authorization request includes a magnetic stripe identifier or a financial account 230, then the authorization service 215 can determine a magnetic stripe payment occurred.

In box 713, the authorization service 215 can determine a financial account 230 to evaluate for authorization of the transaction. If the transaction type 238 is indicated as a contact/contactless transaction, the authorization service 215 can use the card identifier 233 to identify cryptogram keys 234 associated with a user profile 221 of the card identifier 233. In some scenarios, each cryptogram keys 234 in the user profile 221 can be used to generate a server-side cryptogram. In some examples, the server-side cryptogram is generated based at least in part on the cryptogram key and a portion of transaction data from the authorization request.

The authorization service 215 can identify the server-side cryptogram that matches the cryptogram data in the authorization request. For example, a first server-side cryptogram can be generated using the first cryptogram key 234*a* stored in the user profile 221 and a second server-side cryptogram can be generated using the second cryptogram key 234*b* stored in the user profile 221. If the first server-side cryptogram matches the cryptogram data in the authorization request, then the authorization service 215 identifies the first embedded computing device 115*a* was used. The financial account 230 associated with the first embedded computing device 115*a* in the user preferences 227 can be evaluated for authorization. If neither server-side cryptogram matches, then the authorization service 215 can decline the authorization request.

If the transaction type 238 is identified as a magnetic stripe transaction then the authorization service 215 can select or determine the financial account 230 based at least in part a magnetic stripe identifier, the card identifier 233, and/or other data extracted from the authorization request. The extracted data can be used identify the financial account 230 in the user preferences 227.

In box 716, the authorization service 215 can authorize the transaction. The authorization service 215 can evaluate whether to approve the transaction using the identified financial account 230. If the transaction is approved by the evaluation, the authorization service 215 can authorize the transaction.

In box 718, the authorization service 215 can transmit an authorization notification to the merchant system. In some embodiments, the authorization service 215 can transmit the authorized financial account 230 in the authorization notification instead of or in addition to the card identifier 233. As such, the merchant system 209 initially sends the card identifier 233 in the authorization request and receives a selected financial account 230 with the authorization notification.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 7 and sequence diagram of FIG. 5 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowchart of FIG. 7 and sequence diagram of FIG. 5 have a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowchart of FIG. 7 and sequence diagram of FIG. 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A payment instrument, comprising:

a front face;

a rear face;

a first embedded computing device that stores a first cryptogram key, the first embedded computing device being configured to use the first cryptogram key to generate a first cryptogram for a first authorization request associated with a first transaction the first embedded computing device being located on the front face at a first end;

a second embedded computing device that stores a second cryptogram key, the second embedded computing device being configured to generate a second cryptogram for a second authorization request associated with a second transaction, the second embedded computing device being located on the front face at a second end;

wherein the first embedded computing device is associated with a first financial account and the second embedded computing device is associated with a second financial account based at least in part on an arrangement of financial accounts being specified by a client device; and a magnetic stripe that stores the first financial account or a third financial account, the magnetic strip is configured to provide the first financial account or the third financial account to a point of sale (POS) device for a third transaction, the magnetic stripe adhering to the rear face.

2. The payment instrument of claim 1, wherein the first embedded computing device is located at a top portion of the payment instrument, and the second embedded computing device is located at a bottom portion of the payment instrument.

3. The payment instrument of claim 1, wherein the magnetic stripe comprises a first magnetic stripe, the rear face comprising a top portion and a bottom portion, the first magnetic stripe being located at the top portion and a second magnetic stripe is located at the bottom portion.

4. The payment instrument of claim 1, further comprises:

an antenna that is electrically coupled or inductively coupled to the second embedded computing device.

5. The payment instrument of claim 1, further comprises:

an antenna that is electrically coupled or inductively coupled to the first embedded computing device.

6. The payment instrument of claim 5, wherein the front face comprises a first end and a second end, and the payment instrument further comprises:

a first indicium for the first end and a second indicium for the second end, the first indicium representing the first financial account, the second indicium representing the second financial account.

7. The payment instrument of claim 6, wherein the payment instrument further comprises a third indicium located at the first end, the third indicium indicating a presence of the antenna and being representing the first financial account.

8. A payment instrument, comprising:

a front face;

a rear face;

a first embedded device that stores a first cryptogram key, the first embedded device being positioned on the front face at a first end, the first end being configured to engage the first embedded device with a point of sale (POS) device;

a second embedded device that stores a second cryptogram key, the second embedded device being positioned on the front face at a second end, the second end being configured to engage the second embedded device with the POS device, the first cryptogram key and the second cryptogram key being associated with a card identifier; and wherein the first cryptogram key and the second cryptogram key are configured to be used for generating an application cryptogram for an authorization request of a transaction, the authorization request being provided to an issuer system to identify a first financial account or a second financial account to be charged based at least in part on the card identifier and user preferences data, the user preferences data being specified by a client device.

9. The payment instrument of claim 8, further comprising:

a magnetic stripe that stores the first financial account or a third financial account, the magnetic stripe adhering to the rear face.

10. The payment instrument of claim 9, wherein the magnetic stripe is a first magnetic stripe, and further comprises:

a second magnetic stripe that stores the second financial account or a fourth financial account, the second magnetic stripe adhering to the rear face.

11. The payment instrument of claim 10, wherein the rear face comprises a top portion and a bottom portion, the first magnetic stripe is located at the top portion and the second magnetic stripe is located at the bottom portion.

12. The payment instrument of claim 8, wherein the front face comprises a first end and a second end, wherein the first embedded device is located at the first end and the second embedded device is located at the second end.

13. The payment instrument of claim 8, further comprises:

an embedded antenna that is electrically coupled or inductively coupled to the second embedded device.

14. The payment instrument of claim 8, further comprises:

an embedded antenna that is electrically coupled or inductively coupled to the first embedded device.

* * * * *